United States Patent
Serrano et al.

(10) Patent No.: US 7,464,019 B1
(45) Date of Patent: Dec. 9, 2008

(54) METHOD OF RESOLVING CONFLICTS OF VIRTUALIZED DISKS BETWEEN TWO OPERATING ENVIRONMENTS

(75) Inventors: Eduardo Javier Serrano, Rancho Santa Margarita, CA (US); Amy Liu Miura, Laguna Niguel, CA (US); Todd Allen Bumbera, Anaheim, CA (US)

(73) Assignee: Unisys Corporation, Blue Bell, PA (US)

( * ) Notice: Subject to any disclaimer, the term of this patent is extended or adjusted under 35 U.S.C. 154(b) by 902 days.

(21) Appl. No.: 10/891,701

(22) Filed: Jul. 14, 2004

(51) Int. Cl.
G06F 9/455 (2006.01)
G06F 3/00 (2006.01)
G06F 5/00 (2006.01)

(52) U.S. Cl. .............. 703/25; 703/24; 703/27; 710/1; 710/38

(58) Field of Classification Search ............ 703/24, 703/25, 27; 710/1, 38; 719/325, 326
See application file for complete search history.

(56) References Cited

U.S. PATENT DOCUMENTS

| | | | |
|---|---|---|---|
| 5,511,227 A | 4/1996 | Jones | |
| 5,548,783 A | 8/1996 | Jones | |
| 6,108,684 A | 8/2000 | DeKoning et al. | |
| 6,460,113 B1 | 10/2002 | Schubert et al. | |
| 6,493,811 B1 * | 12/2002 | Blades et al. | ........... 711/203 |
| 6,584,511 B1 * | 6/2003 | Marsh et al. | ............. 710/5 |
| 6,625,747 B1 | 9/2003 | Tawil et al. | |
| 6,745,176 B2 * | 6/2004 | Probert et al. | ............ 707/2 |

OTHER PUBLICATIONS

Microsoft, Highly Available Storage: Multipathing and the Microsoft MPIO Driver Architecture, White Paper, Oct. 2003.
EMC Corporation, EMC PowerPath Data Sheet, www.EMC.com, 2003.
EMC Corporation, EMC PowerPath—Storage Virtualization, Solution Sheet, www.EMC.com, 2003.
Jerry Cochran, Why Windows Administrators Should Care About MPIO, Jan. 12, 2004, www.winnetmag.com.

* cited by examiner

*Primary Examiner*—Paul L Rodriguez
*Assistant Examiner*—Dwin M Craig
(74) *Attorney, Agent, or Firm*—Alfred W. Kozak; Robert P. Marley (57) ABSTRACT

A method is provided in a server, having a first operating system (Windows) and a second operating system (MCP), to allow both environments to share the same resilient and redundant benefits provided by the Fibre Channel storage systems with multi-path capabilities and to ensure that MCP formatted disk units in a virtualized environment in the first operating system will only receive and accept MCP formatted data from the second.

11 Claims, 8 Drawing Sheets

METHOD OF RESOLVING CONFLICTS OF VIRTUALIZED DISKS BETWEEN TWO OPERATING ENVIRONMENTS

CROSS-REFERENCES TO RELATED APPLICATIONS

This application is related to U.S. Pat. No. 6,728,896 entitled "Failover Of A Simulated Operating System In A Clustered Computing Environment", which is included herein by reference.

FIELD OF THE INVENTION

This invention teaches that with the availability of Fibre Channel technology, more and more disk storage systems can provide multi-path capabilities in their configurations. The multi-path management software typically uses virtualization techniques to provide improved performance (i.e. load balancing) as well as resiliency features (i.e. failover).

BACKGROUND OF THE INVENTION

The Unisys ClearPath MCPvm Servers require no additional hardware other than what comes with the typical Unisys Intel platform, which is running Microsoft Windows™ software to execute the Unisys Master Control Program (MCP) and associated User applications. The MCPvm Servers will still continue to execute code for both the Windows™ operating system, and also the MCP operating system.

The Virtual Machine for ClearPath MCP (VMMCP) software works to enhance the features and functionalities of already-provided VMMCP software releases. These provide for: (i) open server flexibility, where integrated operating environments work concurrently to support both Windows™ and Unisys MCP operating environments; (ii) seamless client-server integration; (iii) scaleable computing with entry to midrange enterprise server performance on current Intel processor technology; (iv) Open Industry Standards, where an enterprise server built on open standards, such as SCSI Ultra 802.3 (Ethernet) LAN interconnect fibre channel connections with copper and optical interfaces, and open software interfaces.

Figure 1A:
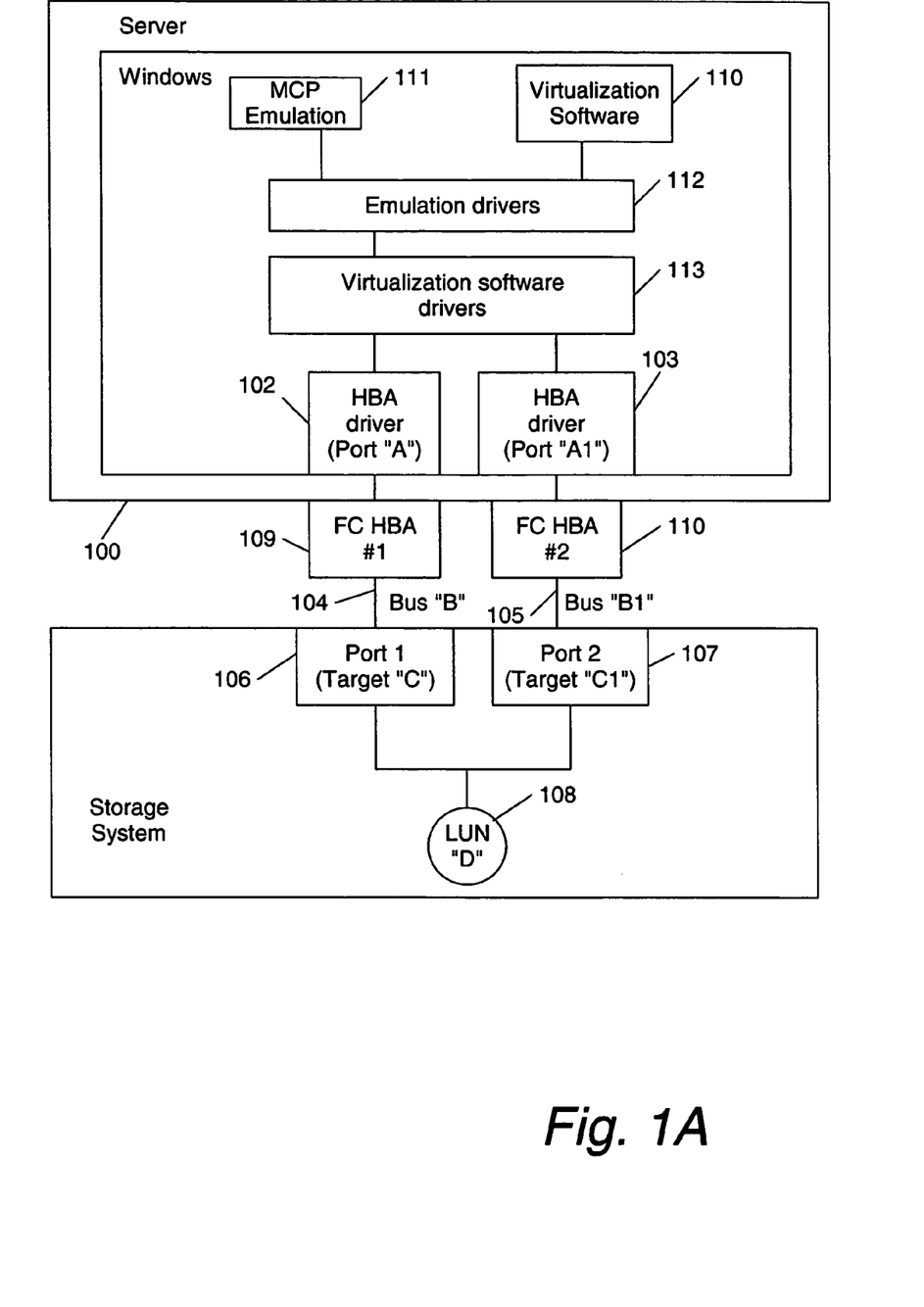
FIGS. 1A and 1B are drawings illustrating the environment in which the method of the present invention is used.

FIG. 1A is a generalized drawing showing a typical server which has a first and second operating system. For example, the first operating system is the Windows™ operating system. The second operating system is the Unisys Master Control Program (MCP) operating system, which can run as a Windows application.

However, because of different protocols, these systems would normally not be compatible except for the use of the Virtual Machine for ClearPath MCP software which translates and interrelates the operating language of the Windows™ system into the Master Control Program operating system and vice-versa, that is to say, the Master Control Program operating system can be made compatible to the Windows™ operating system via the Virtual Machine for ClearPath MCP (VMMCP) software.

Figure 1B:
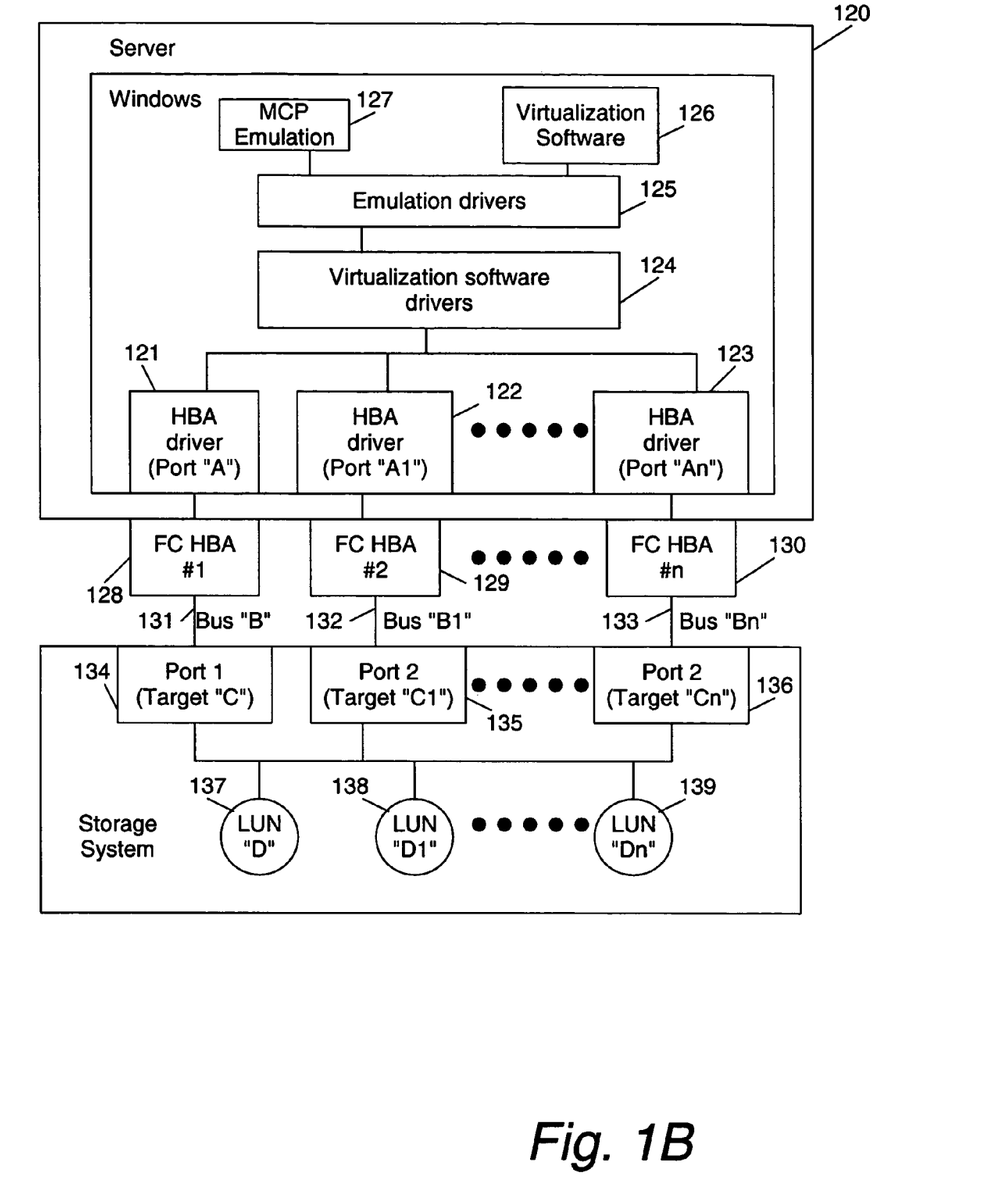

In a multi-path configuration, a single disk device, i.e. a hard disk or a logical disk presented with a Logical Unit Number (LUN), is physically connected to multiple host bus adapters (109, 110). FIG. 1A) either through direct connection or in a Storage Area Network. Therefore, this disk device has multiple SCSI (Small Computer System Interface) addresses. For example, in a simple dual-path I/O configuration illustrated in FIG. 1A, where a LUN (108) of a storage system is configured to be visible to two storage ports (106, 107) of a storage system. Each port of the storage system is connected to the server via a different Fibre Channel Host Bus Adapter. This LUN is presented to the host operating system (OS) with two SCSI addresses, representing two possible I/O paths. In FIG. 1A, LUN D possesses one SCSI address, Port A, Bus B, Target C, LUN D, through FC HBA 1 (109) and another address, Port A1, Bus B1, Target C1, LUN D, through FC HBA 2 (110). Without Virtualization, the OS (Windows) will represent such a disk twice to the application. In the example above, LUN D is presented to Windows™ applications as two disk drives. The example in FIG. 1A can be expanded to a more complex multi-path I/O configuration as shown in FIG. 1B, where each LUN is configured to be visible to multiple ports and thus possesses multiple SCSI addresses.

This type of configuration in FIG. 1A is not only confusing to manage but is a potential threat to data integrity. Therefore, the vendor who provides the multi-path capability of a disk storage system typically provides a multi-path software that uses a virtualization technique to hide the multiple instances of a disk device. The virtualization techniques are proprietary to the storage vendors and specific to each storage system. In addition to the multiple "physical" representations ("physical disk node") that the OS (Windows)™ already supplies, the multi-path software presents to the OS an additional single "virtualized" device ("virtual disk node"). Consequently, the physical disk nodes are "hidden" and only virtual nodes are given access for I/O operations from the OS and its applications. The SCSI address of a virtual node can be the SCSI address of any of its associated physical nodes. In the example that was given in FIG. 1A, the Windows OS represents LUN D as two physical nodes and one virtual node.

Figure 2:
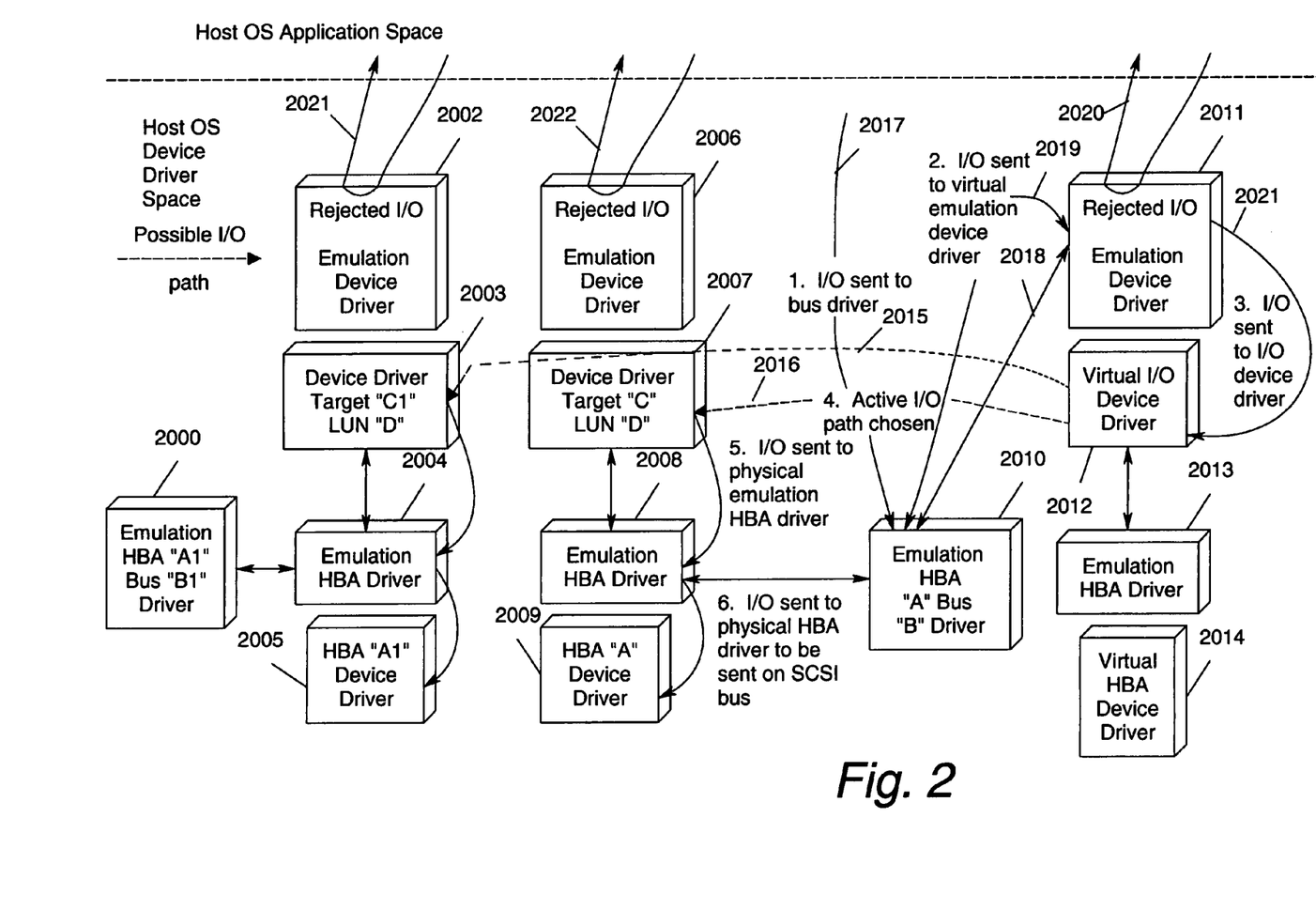
FIG. 2 is a drawing that illustrates the device drivers and their use.

FIG. 2 illustrates this representation as it is structured in the host OS device driver space. One of the two physical nodes for LUN D is the combination of items 2002 and 2003 in FIG. 2. The other physical node for LUN D is the combination of items 2006 and 2007. The virtual node is the combination of 2011 and 2012. The SCSI (Small Computer Systems Interface) address of the virtual node can be either Port A Bus B Target C LUN D (2015) or Port A1, Bus B1, Target C1, LUN D (2106), depending on which I/O path the multi-path software (110 in FIG. 1A) decides to be "active."

Disk virtualization is not an issue for most applications running on the host OS because most applications directly send I/O to disks presented by the OS and are unaware of the low level details of the I/O path. The OS has made the specifics of a disk (e.g. SCSI address, vendor ID, etc) transparent from the application. However, with an application that is using a SCSI pass-through method to send I/O directly to the SCSI disk, disk virtualization becomes a challenge.

For example, the Virtual Machine for ClearPath MCP software emulates the Unisys Proprietary Master Control Program (MCP) (111 in FIG. 1A) on a server running Microsoft's Windows™ operating system. Without methods to recognize and handle disk virtualization, it is impossible to emulate the MCP I/O subsystem using commodity disk storage systems. The specific problems that have to be dealt with are described in the related art.

One related art method to which the method of the present invention generally relates is described in U.S. Pat. No. 6,108,684 entitled "Method And Apparatus For Balancing Loads On A Storage Subsystem Among A Plurality Of Controllers". This relates art includes Methods and associated apparatus for balancing the I/O request processing load within a plurality of controllers in a storage subsystem. The methods of U.S. Pat. No. 6,108,684 are operable within interconnected controllers of a storage subsystem to shift the processing of received I/O requests to less loaded controllers an to do so in a manner transparent to legacy attached host systems. In a first embodiment of the related art referred to as back-end load balancing, I/O requests are transferred from a first controller, to which the I/O request was directed by the attached host system, to a second controller for further processing. In this back-end load balancing embodiment, all write data associated with a write request as well as returned information including status or read data, is exchanged between the first and second controllers such that the first controller performs all communication with the attached host system. In a second embodiment of U.S. Pat. No. 6,108,684 referred to as front-end load balancing, the first controller receives an I/O request and transfers the request of a second controller. The second controller then completes the I/O request including any requisite communication with the attached host system to receive write data from the host system or to return status or read data to the host system. The return status or read data to the host system. The second controller uses a false ID value, or otherwise substitutes itself for he first controller, in communicating with the attached host system such that the attached host system is fooled to believe that all communication is with first controller.

The present invention differs from the above prior cited art in that the prior invention deals mainly with load balancing, whereas the method of the present invention does not directly deal with load balancing, as this is the responsibility of multi-pathing software. The method of the present invention can be used to work in conjunction with multipathing (virtualization) drivers. The present invention manages two operating systems and enables disk compatibility for one operating system to access storage units.

Yet another related art method to which the method of the present invention generally relates is described in U.S. Pat. No. 6,625,747 entitled "Computer Storage System And Failover Method". This related art describes a system and method of performing failover in a storage area network. In one embodiment of the present disclosure, a computer network includes a host and a storage system associated with the host. The storage system has a first controller with a first port and a second controller with a second port. The first controller is assigned a common node name and the first port is assigned a first port name. The second controller is assigned a common node name and the second port is assigned a second port name. More specifically a multipathing driver is operable to determine a signal path for a communication sent to a storage device associated with the first controller and the second controller and operable to perform failover operations if the signal path fails.

The present invention differs from the above prior cited art in that the prior invention deals manly with failover whereas the method of the present invention does not directly deal with failover, as it is the responsibility of the multi-pathing software. The method of the present invention can, however, can be used to work in conjunction with multipathing drivers. Further, the present invention utilizes first and second operating systems (OS) such as will block non-compatible formats of the first OS (Windows™) and permit transmission of compatible formats to disk storage from the second operating system (MCP).

SUMMARY OF THE INVENTION

The object of this invention is to provide a method to resolve conflicts of virtualized disks between two operating systems so both environments can share the same resilient and redundant benefits provided by the Fibre Channel storage system with multi-path capabilities.

One existing problem is that the Unisys MCP (Master Control Program) supports a disk format that is different from any disk format that is used in the host OS (Operating System) such as Window™. These disks have to be dedicated for the MCP environment. Before multi-path storage systems became available, the emulation software had been dealing with "physical disk nodes" only. With disk virtualization software running on the host OS (Operating System) (for example, Windows™), and presenting an additional "virtual disk node" for each disk, the host OS (Operating System) can now also access the MCP disks through the "virtual disk nodes," corrupting the MCP format. Under these conditions, it was not possible to configure heterogeneous types of disks (e.g. MCP disks and Windows™ disks) in the same storage system.

A method was needed in the emulation software (111 in FIG. 1A) to recognize MCP disk "virtual disk nodes") to prevent their use by the Windows™ host OS (Operating System), and present them to the MCP so the associated disk devices can be utilized in the MCP environment.

In order to accomplish this objective, two things were done:

1. For each SCSI bus (2000, 2010 in FIG. 2) in the system, there must be an emulation OS device driver representing it. The responsibilities of this emulation bus driver is to:
   Provide an I/O destination for supported emulation applications sending SCSI pass-through I/O to a disk device (2017 in FIG. 2).
   Provide an interface for disk devices to "register" and "de-register" themselves as available SCSI pass-through I/O paths (2018 in FIG. 2).
   Send the SCSI pass-through I/O to the "registered" disk devices (2019 in FIG. 2).

2. For each disk device represented by the host OS, there must be an emulation OS device driver (2002, 2006, 2011 in FIG. 2) associated with it.

A disk device represented by the host OS can be categorized as either "visible disk nodes" or "hidden physical disk nodes" to applications.

The responsibilities of the emulation device driver in the "visible disk node" (2011/2012 in FIG. 2) is to:
   Determine if the disk device is supported by the emulation applications.
   Determine what SCSI address to assign the disk device based on the database of possible SCSI addresses.
   Register the SCSI address of the disk device to the supported emulation applications.
   Register the SCSI address of the disk device to an associated emulation bus driver (2018 in FIG. 2).
   Block (i.e. Stop) I/O sent directly to the device from an application or host OS (2020 in FIG. 2).
   Send the I/O to the virtualization software drivers (2021 in FIG. 2) in order to be routed to the "active" I/O path (2015 or 2016 in FIG. 2).

The responsibilities of the emulation device driver in the "hidden physical disk node" (2002/2003, 2006/2007 in FIG. 2) is to:
   Generate a database of possible SCSI addresses for the disk.
   Block (i.e. Stop) I/O sent directly to the device from an application or host OS (2021, 2022 in FIG. 2).

Another problem that exists is that the SCSI addresses for a virtual node (2011/2012 in FIG. 2) in a multi-path configuration can change dynamically, depending on the active I/O path at the time. Since the MCP I/O method requires the SCSI address to be used in order to send the I/O request, a method is needed to hide this dynamic behavior and provide a static SCSI addressing environment.

For example, if the MCP expects a static I/O subsystem, requiring all its peripherals to be pre-defined in a table called Peripheral Configuration Diagram (PCD), it also expects the SCSI address for each device to be static. The MCP uses this information to send all I/O via the SCSI pass-through method. Any change in the SCSI address for a device requires a change in the PCD, which in turn, requires a reboot of the MCP environment.

The solution to the aforementioned problem is to provide a static SCSI address for each multi-path disk that is owned by the MCP. The selection of the static SCSI address is explained further in the flowchart in FIGS. 4A, 4B, 4C. This address will be recorded in a Peripheral Configuration Diagram and will be provided as the MCP makes its inquire about the disk.

GLOSSARY OF RELEVANT ITEMS

1. Failover: This involves the process of moving resources from one node (computer) to another node (computer) if a failure occurs.

2. Fibre Channel: This is a type of transmission path used as an internal computer channel, as well as a network medium. It works with existing interfaces, such as IPI, SCSI, and HiPPI. In a Local Area Network it can be used as a high speed backbone. Speeds range up to 100 megabytes per second using optical fibre.

3. Fibre Channel Technology: This technology has become the prevailing methodology for attaching disks in MCPvm Servers and other Unisys systems, such as ClearPath over the past few yeas. This is due to a variety of advantages over other technologies, including high transfer rates, extreme scalability, long distance transmission capability, and high reliability.

4. VIRTUAL MACHINE (FOR CLEARPATH MCP): This is a set of software programs which emulates the harder which would be involved in the Unisys Master Control Program. Thus, the MCP (Master Control Program) of Unisys can be run as an application on top of the Windows™ operating system.

5. MCP (Master Control Program): Unisys Master Control Program/Advanced Systems. The comprehensive virtual memory operating system, which drives the Unisys A Series family of hardware.

6. MCP I/O Subsystem: This is the components in the MCP operating system that the I/O travels from the application or the OS to the peripheral devices.

7. MCP Disks: Disks that are exclusive to the MCP operating environment.

8. Multi-path Capabilities: Ability to support multiple connections from one host to one or more disks in the storage system.

9. Virtualization Techniques: Methodology used to create virtual devices for any physical device. This is one technique used to mange multi-path storage configuration. Each storage vendor typically has its own implementation for virtualization.

10. Load Balancing: The ability of the I/O (Input/Output) subsystem to issue I/O's over all the available data paths to disk, thus increasing overall throughput.

11. Logical Unit Number (LUN): An identifier used on a SCSI bus to distinguish between logical units with the same SCSI target ID.

12. Host Bus Adapters (HBA): A hardware device that "connects" the operating system and a SCSI bus.

13. Commodity Disk Storage: Disk Storage Systems that are not proprietary to Unisys servers. They are "off-the-shelf" and can be attached to a variety of servers such as Windows™ servers or Unix servers.

14. Windows™ Disks: Disks that are formatted for use in Windows™ operating environment.

15. Emulated Operating System: The most common form of emulation is that of a software emulator, a piece of computer software that allows certain computer programs to run on a platform (computer architecture and/or operating system) other than the one they were originally written for. It does this by "emulating", or reproducing, the behavior of one type of computer on another by accepting the same data, executing the same programs, and achieving the same results. Most emulators just emulate a hardware architecture—if a specific operating system is required for the desired software, it must be provided as well (and may itself be emulated). Both the OS and the software will then be interpreted by the emulator, rather than being run by native hardware. Apart from this interpreter for the emulated machines's language, some other hardware (such as input or output devices) must be provided in virtual form as well: if writing to a specific memory location should influence the screen, for example, this will have to be emulated as well.

16. Storage Area Network: A network of hosts and storage systems connected by one or more Fibre Channel switches.

17. SCSI (Small Computer Systems Interface): The most popular processor-independent standard, via a parallel bus, for system-level interfacing between a computer and intelligent devices including hard disks, floppy disks, CD-ROM, printers, scanners, and many more. SCSI can connect multiple devices to a single SCSI adaptor (or "host adaptor") on the computer's bus. SCSI transfers bits in parallel and can operate in either asynchronous or synchronous modes. The synchronous transfer rate is up to 5 MB/s. There must be at least one target and one initiator on the SCSI bus.

18. SCSI Pass-Through Method: Method of sending I/O to a device by specifying SCSI commands in the I/O itself.

19. Emulation OS Device Driver: Device driver used by the emulation OS to perform I/O operations.

20. Visible I/O Device: I/O device visible and directly accessible to applications.

21. Hidden I/O Device: I/O device not visible or directly accessible to applications.

22. Active I/O Path: The path chosen by virtualization device drivers to send I/O to another driver.

23. Physical Node: Software representation of an existent hardware device in the host OS.

24. Peripheral Configuration Diagram (PCD): This is the peripheral configuration file that is used by the Unisys MCP I/O subsystem.

25. PowerPath: An EMC™ software package is used for Local Balancing and failover of the Symmetrix subsystems and some models of the CLARiiON subsystems. Monitors each I/O path, dynamically distributing I/O evenly across available paths, and handling failures when they are detected.

26. EMC™ Symmetrix: At the high end of the disk subsystem spectrum, providing a high level of configurability and many features. With the ability to connect multiple ports of both Fibre Channel and SCSI, the subsystem is capable of handling extremely large disk throughput to many systems at once. Major software features of the EMC™ Symmetrix include PowerPath for automatic failover and load balancing.

27. SP (Storage Processor): This is the Storage Processors (A and B) that are on the EMC™ CLARiiON series of storage systems for EMC™ Corp.

28. LPxxxx: This describes the Emulex LP8000 or LP9000 series of Fibre Channel Host Bus Adapters.

29. Multipath Software: Software that manages a multi-path configuration. This type of software typically is supplied by the storage vendor. For example, EMC PowerPath is a Multi-path software.

30. Node: Connecting point at which several lines come together.

31. Virtual Node: Software representation of a non-existent hardware device in the host OS.

32. Virtual Machine for ClearPath Software: See definition in VIRTUAL MACHINE (FOR CLEARPATH MCP). See Glossary Item #4.

33. Virtual Machine: The original meaning of virtual machine is the creation of a number of different identical execution environments on a single computer, each of which exactly emulates the host computer. This provides each user with the illusion of having an entire computer, but one that is their "private" machine, isolated from other users, all on a single physical machine. The term virtual machine is now also used to refer to the environment created by an emulator, where software is used to emulate an operating system for the end user, while the computer runs its own native operating system.

34. Target: A SCSI device that executes a command from a SCSI initiator to perform some task.

35. Initiator: A device that begins a SCSI transaction by issuing a command to another device (the SCSI target), giving it a task to perform.

36. CX600: This is the high end EMC™ CLARiiON storage system of EMC™ Corp.

37. Application Database: Database containing information relevant to, and accessible by, applications.

38. SAN (Storage Area Network) Attach: The type of connection where storage systems are connected to their hosts via a Fibre Channel switch.

39. Per-Device Storage: Memory dedicated to a single instance of a device driver.

40. I/O Device Information: Information relevant for an application to perform I/O to a device.

41. MCP Format: This is the disk format that is exclusively used by the MCP operating system.

NOTES

EMC=Trademark TM of EMC Corp.

Symmetrix is a copyright of EMC.

ClearPath=TM of Unisys

Windows™ NT—Copyright of Microsoft.

GENERAL OVERVIEW

The present invention involves a method of solving inconsistency of virtual machines by offering options for ordering and configuring a server's disk subsystems. It should be noted that all choices depend on the relative importance of the following alternative, often time-conflicting, goals: reliability, performance, compatibility, and cost.

Reliability is a function of the overall fault tolerance and reliability of the server topology, the subsystem, the components, and the disks themselves. Redundant components provide higher reliability but add cost to the system. Very often, this redundancy can increase available bandwidth, as with the load-balanced capability of the PowerPath feature of EMC™ symmetrix and CLARiiON. More paths to disk can also provide failover capability, as with the PowerPath feature of EMC™ Symmetrix and CLARiiON product lines. It should be noted that the EMC™ Symmetrix is at the high end of the disk subsystem spectrum, providing a high level of configurability and many features. With the ability to connect multiple ports of both Fibre Channel and SCSI, the subsystem is capable of handling extremely high disk throughput to many systems at once. Major software features of the EMC™ Symmetrix include PowerPath for automatic failover and load balancing. It should also be noted that CLARiiON subsystems provide a strong entry-level storage solution by providing good disk capability to most installations.

It is important to note that the CLARiiON and EMC™ Symmetrix are just two examples of disk subsystems available for use in the method of the present invention.

Often, compatibility of disks across multiple hosts is a priority to enable, either ease of migration from an older server to the MCPvm (Master Control Program, virtual machine) server, or to allow data to move back and forth to achieve specific business goals. If compatibility is not an issue, however, the method of the present invention will deliver superior overall performance and reliability because the feature enables the method to take full advantage of both Windows™ and Windows-based applications of disk subsystems.

Under certain conditions, it is possible to configure disk subsystems to provide some special capabilities. The first one is load balancing, which is the ability of the I/O subsystem to issue I/O's over all available data paths to disk, thus increasing overall throughput. The other capability is failover, which is the ability of the I/O subsystem to detect a broken path to disk and dynamically reroute current and subsequent I/O's through other available paths until the broken path is repaired.

These load balancing and failover capabilities can be enabled by a variety of means, depending upon the disk subsystem and the volume format being used.

DESCRIPTION OF PREFERRED EMBODIMENT

FIG. 1A is a drawing illustrating the basic configuration and architecture of the method of the present invention. A computer 100 exits, and includes two ports, Port "A" (Item 102), and Port "A1" (item 103). A connection is then made from port A and A1 (Items 102, and 103) through two buses—Bus "B"0 (Item 104), and Bus "B1" (Item 105). Whatever communication is made between the ports and the buses, is then passed through to a Target "C" (Item 106) and "C1" (Item 107), which includes a disk of LUN (Logical Unit Number) "D" (Item 108). This figure demonstrates a simple multi-path configuration with two paths (104, 105). Each path gives LUN D a unique SCSI address so an I/O can be performed to LUN D via either address. The Emulation Drivers (Item 112) hide the multiple SCSI addresses from the MCP environment 111 by presenting one unique static SCSI address to the MCP while allowing the Virtualization Software Drivers 113 to select the "active" path for the I/O to take place.

FIG. 1B is a multiplicity of FIG. 1A, showing a larger, more complex configurations with n ports, n buses, n LUNs involved. A computer 120 exists, and includes multiple ports, Port "A" (Item 121), and Port "A1" (item 122), and up to "n" number of ports, such as Port "An" (item 123). A connection is then made from port A, A1 and up to An (Item 121, 122, and 123) through multiple buses—Bus "B" (Item 131), Bus "B1" (Item 132), and up to as many as Bus "Bn" (Item 133). Whatever communication is made between the ports and the buses, is then passed through to a Target "C" (Item 134), "C1" (Item 135), and up to as many as "Cn" (Item 136), which includes multiple disks of LUN (Logical Unit Number) "D" (Item 137), "D1" (Item 138), and up to as many as "Dn" (Item 139). This figure demonstrates a large multi-path configuration with multiple paths (131, 132, and 133). Each path gives each LUN a unique SCSI address so an I/O can be performed to a LUN via any address. For example, LUN D may possess addresses, Port A Bus B Target C LUN D, Port A1 Bus B1 Target C1 Lun D, Port A2 Bus B2 Target C2 Lun D, . . . Port An Bus Bn Target Cn Lun D. The Emulation Drivers (Item 125) hide the multiple SCSI addresses from the MCP environment 127 by presenting one unique static SCSI address to the MCP while allowing the Virtualization Software Drivers 124 to select the "active" path for the I/O to take place.

FIG. 2 is a drawing, which illustrates the architecture of the present invention, the components that it includes and the flow of an I/O from the application space to the HBA (Host Bus Adapter). A possible I/O (Input/Output) path exists, and includes "rejected I/O" by the Emulation Device drivers (Item 2002, 2006, 2011). The Emulation Device Drivers reject the I/O by returning an error if an I/O is sent directly from applications. The Device Drivers, which represent Target "C1" LUN "D" (Item 2003) and Target "C" LUN "D" (Item 2007), are layered below the Emulation Device Drivers. These Device Drivers are derived from their respective Emulation HBA drivers (Item 2004, Item 2008). The Emulation HBA drivers (Item 2004, Item 2008) create their respective Emulation HBA Bus drivers which represent HBA "A1" Bus "B1" (Item 2000) and HBA "A" Bus "B" (Item 2010). The Emulation HBA Drivers are layered above the device driver which represent their respective HBA "A1" (Item 2005) and HBA "A" (Item 2009).

An I/O (Input/Output) is sent from the emulation application software to the Emulation HBA bus driver first, and then the I/O is forwarded to the virtual emulation device driver (Item 2011). The I/O is passed down to the virtual I/O device driver (Item 2012), which chooses an active I/O path (Item 2015 or 2016). At this point, the I/O can be sent to only one of the two Device Drivers (Item 2003 or Item 2007) depending on which the virtual I/O device driver chose. Depending on which Device Driver was chosen, the I/O is sent to its respective Emulation HBA driver (Item 2004 or, 2008). The Emulation HBA driver then passes the I/O down to its HBA Device driver layered below it (Item 2005 or Item 2009) to be sent on a SCSI bus.

Figure 3A:
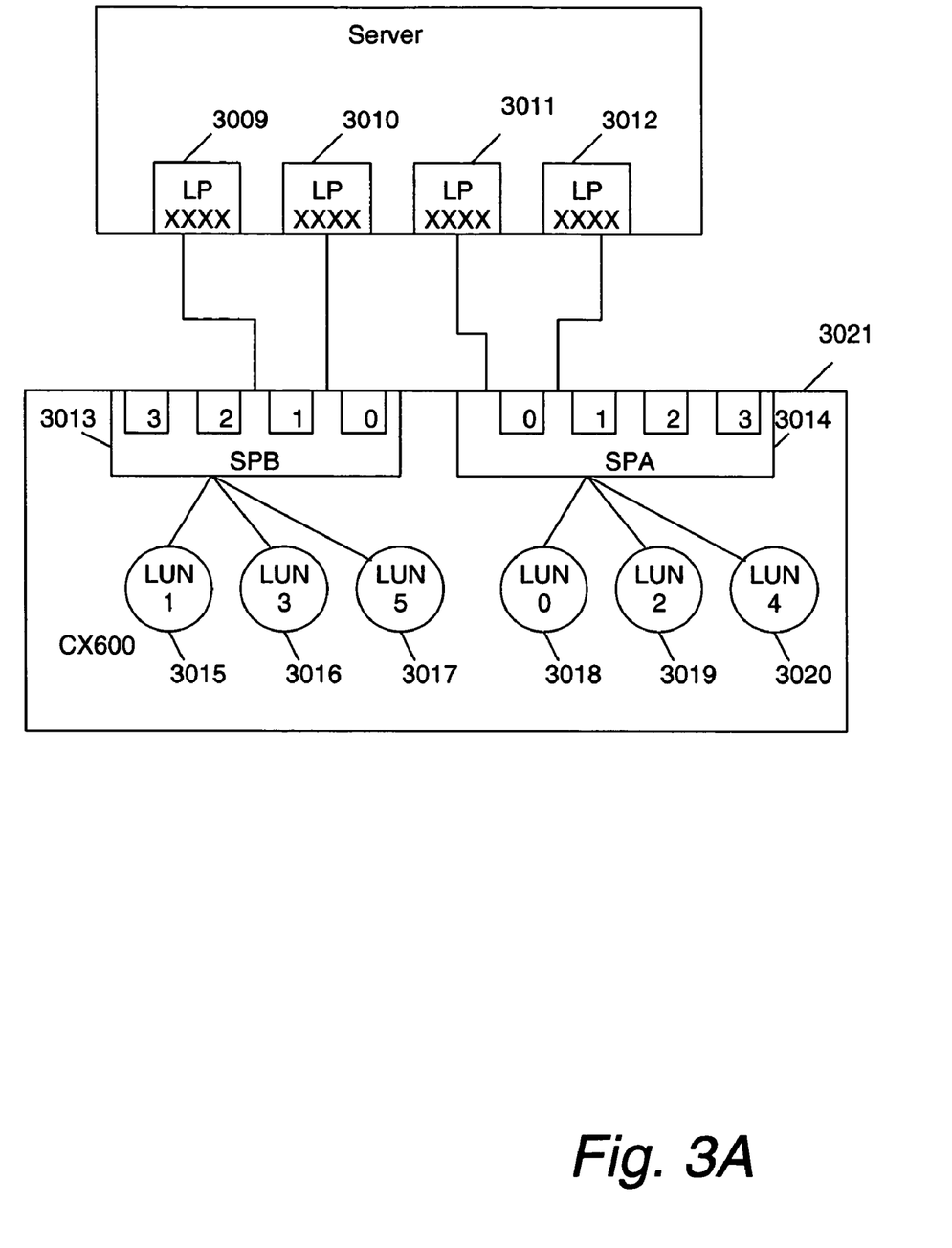
FIGS. 3A and 3B illustrate specific environments in which the method of the present invention may be used.

FIG. 3A illustrates a drawing of a specific example of how the method of the present invention could work. The drawing illustrates Unisys servers, connecting specifically to an EMC™ CLARiiON CX600 storage system using Direct Connect running PowerPath as its multi-path software. The CX600 has two Storage Processors (SP), SPA (Item 3014) and SPB (Item 3013). Each Storage Processor (SP) has 4 ports. The most effective way to achieve load balancing and failover in this CLARiiON storage subsystem is through the use of PowerPath. PowerPath distributes I/O to a Logical Unit Number (LUN) through different ports on the Storage Processor (SP) that owns the LUN disks (Items 3015-3020). These are the active I/O paths. The ports of the other SP (Storage Processor) are passive (or standby) as far as this LUN is concerned and it is only used for failover. There is no load balancing across the Storage Processors.

In FIG. 3A, direct Connect with PowerPath MCPvm Redundancy is available at the HBA level (Items 3009 through 3012). That is, if one HBA fails, I/Os will transmit through the other HBA. Redundancy at the Storage level is provided across the multiple ports of each Storage Processor (SP) as well as cross SP's. If any one port on the same SP fails, the other port(s) take over. If the Storage Processor (SP) fails, all LUN's on that SP are "trespassed" to the other SP and I/O continues through the other SP. Load balancing is performed at the HBA level and across the multiple ports of the same SP. I/O to a device is only routed through the SP that owns the device. Although there are multiple I/O paths to each LUN, only one SCSI Channel (MCP's SCSI controller) will be presented in the PCD (Peripheral Configuration Diagram) file to the MCP. All load balancing and failover activities are carried out at the device level by PowerPath. I/O activates to each device can be monitored through the PowerPath Administrator.

In the Direct Connect configuration of FIG. 3A, each LUN has two I/O paths. For example, I/O to LUN 0 can go through SPA port 0 (SPA0) or SPA port 1 (SPA1). I/To to LUN 1 can go through SPB port 0 (SPB0) or SPB port 1 (SPB1). If SPB1 fails or the LPxxxx (Items 3009) HBA connecting to it fails, all I/O to LUN 1 is routed via SPB0. If the entire SPB (3013) fails, LUN 1, 3, and 5 are automatically "trespassed" to SPA (3014). I/Os to LUN 1 are then routed via SPA0 and SPA1. It should be noted that the blocks labeled LPxxxx (Items 3009-3012) in FIG. 3A represent Fibre Channel Host Bus Adapters, which are typically Emulex LP8000 or LP9000 adapters.

Figure 3B:
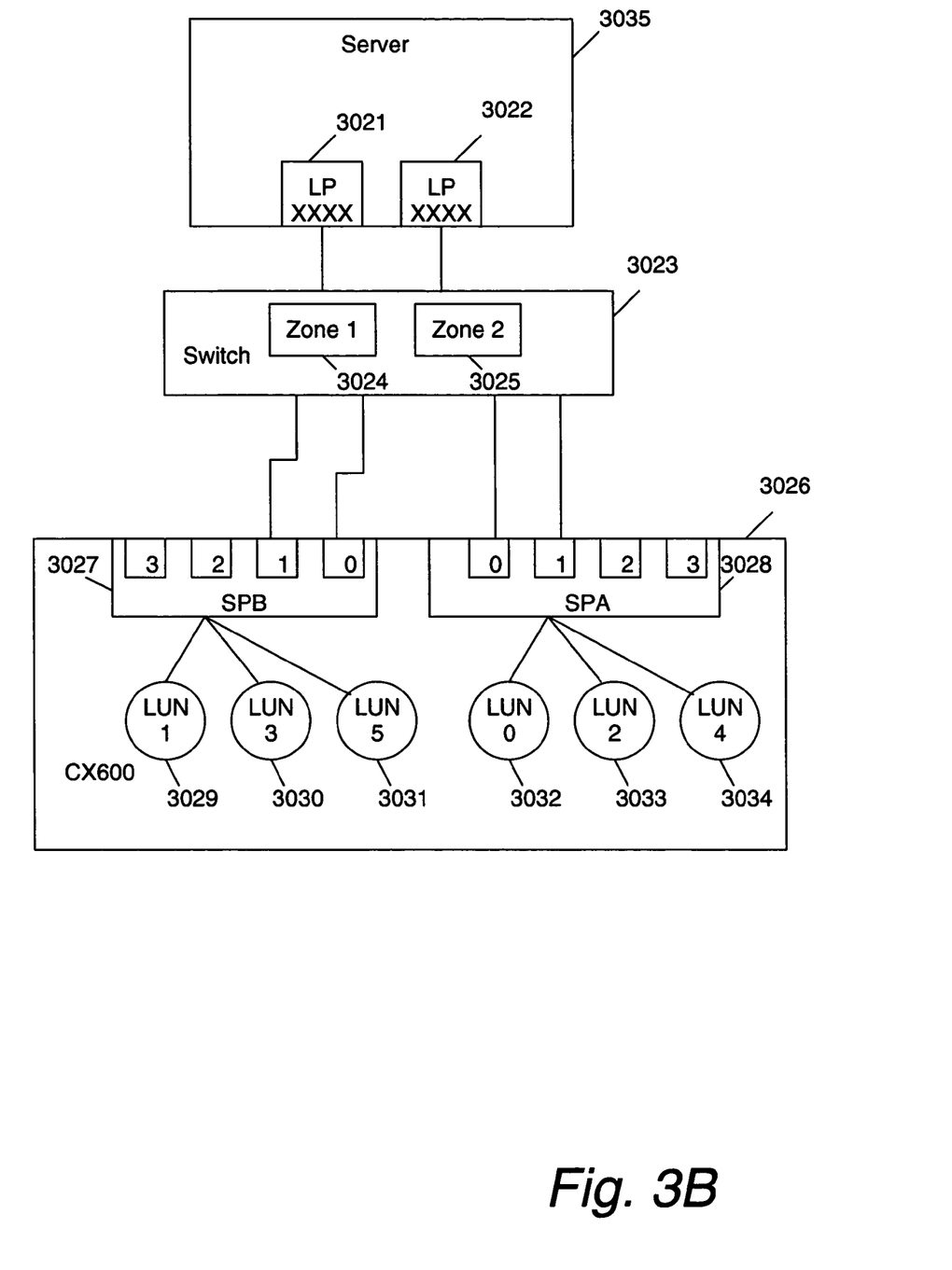

FIG. 3B is a drawing which illustrates an example of the method of the present invention with SAN Attach using PowerPath. The same capabilities provided through a Direct Connect using PowerPath are available in a SAN Attach configuration. By zoning the switch in a certain way, SAN Attach offers more opportunities for more paths and more redundancy. FIG. 3B gives the maximum load balancing and redundancy effect using two HBA's and two ports of each SP [(SPA—Item 3028), and (SPB—Item 3027)]. The switch is configured in a way to allow each HBA access to all four working ports, SPA0, SPA1, and SPB0, and SPB1.

Each LUN (Items 3029-3034) has four paths. For example, I/O's to LUN 0 are distributed via HBA #1 (3021) to SPA0 (Item 3028) and SPA1 as well as via HB #2 (3022) to SPA0 and SPA1. If any one of the Storage Processor (SP) port fails, or if either of the HBA (3021, 3022) fails, I/Os are automatically switched to the other port. If the entire SP fails, all of the LUN's on that SP are "trespassed" to the other SP and I/To continues through that SP.

The zoning configurations depicted in FIG. 3B is not the only one that is supported. It is also possible to use multiple switches if one does not want the switch to be the single point of failure in the configuration. A different zoning can also be chosen as long as the single-HBA guidelines is followed.

Figure 4A:
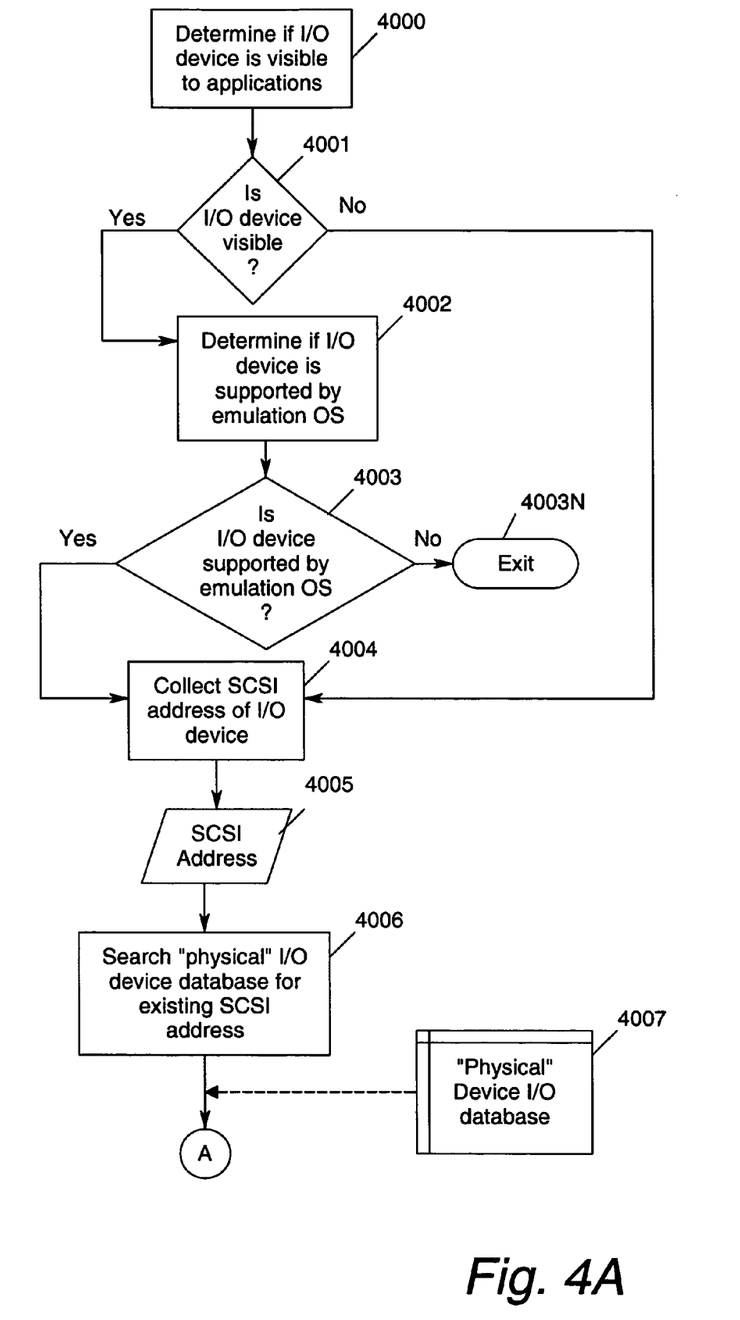
FIGS. 4A, 4B and 4C are flowcharts illustrating the process of the method of the present invention.

FIG. 4A begins by determining if the I/O device is visible to applications (Item 4000), and then performs an inquiry (Diamond 4001) to check if the I/O device is visible. If the answer to inquiry 4001 is YES, and the I/O device is indeed visible, a process to determine if the I/O device is supported by the emulation OS is initiated (Block 4002). Another inquiry is then made at Diamond 4003 to check if the I/O device is supported by emulation OS.

If the answer to inquiry 4001 is NO, and the I/O device is not visible, the flow continues to collect the SCSI address of the I/O device (Block 4004), and continues through the process.

If the answer to inquiry 4003 is NO, and the I/O device is not supported by emulation OS, the process exits at step 4003N. If the answer to inquiry 4003 is YES, and the I/O device is supported, the SCSI address of the I/O device is collected (Block 4004). Next, a process to search "physical" I/O device database (Item 4007) for the existing SCSI address (item 4005) is initiated (Block 4006), and the process continues to FIG. 4B through connector A.

Figure 4B:
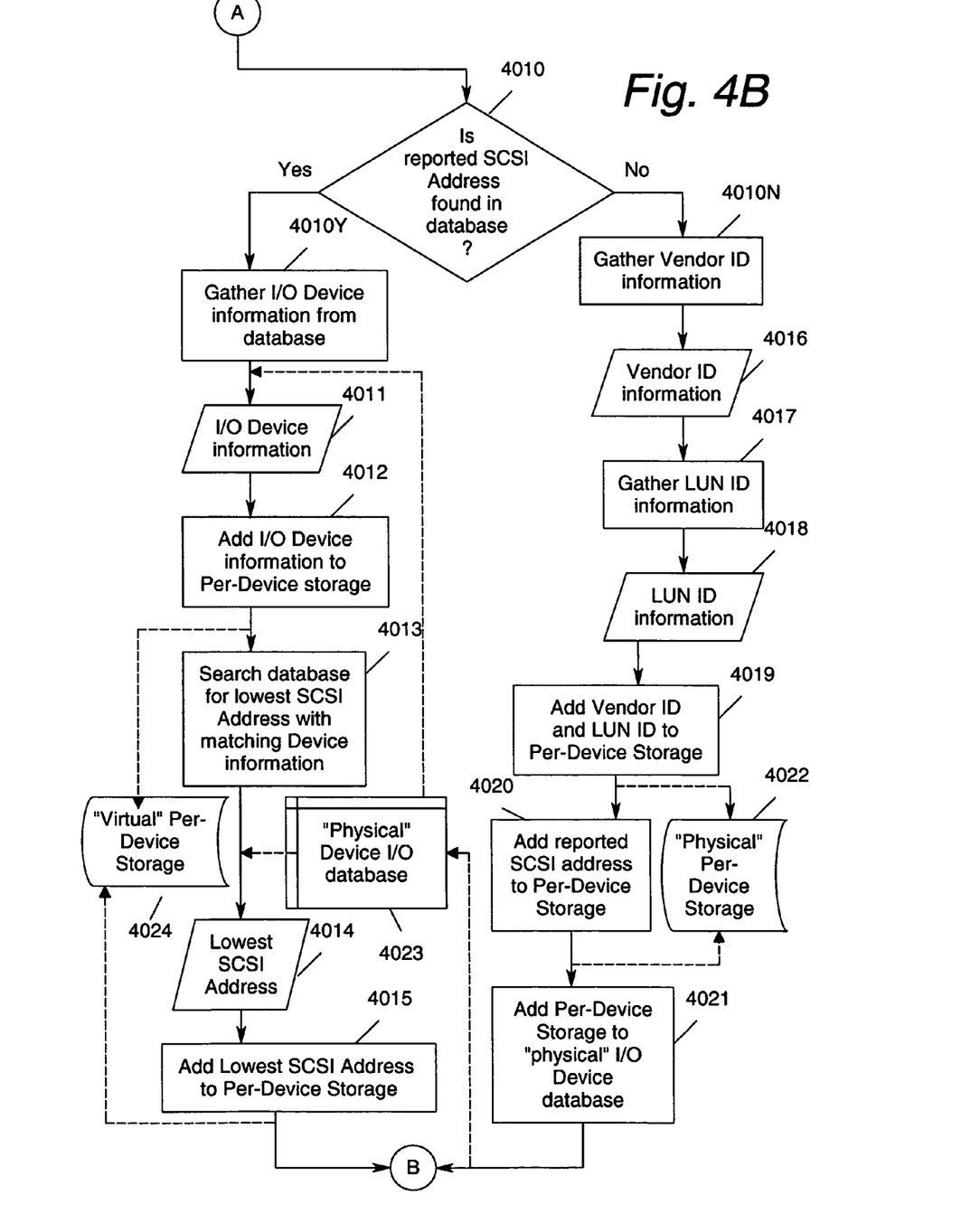

FIG. 4B continues from FIG. 4A by performing an inquiry to check if the reported SCSI address is found in the database (Diamond 4010).

If the answer to inquiry 4010 is YES, and the SCSI address is found in the database, I/O device information (e.g. the Vendor ID and Device ID) is gathered from the database (Block 4010Y), and the I/O device information (Item 4011) is added to Per-Device storage (Block 4012). Per-Device storage is memory dedicated to a single instance of a device driver to be used for storage of information. The database is then searched through for the lowest SCSI address with matching device information (Block 4013), and the lowest SCSI address (Item 4014) is added to Per-Device storage (Block 4015). For example, in a configuration detailed in FIG. 2, both the physical disk nodes (2002/2003 and 2006/2007) will both have the same Vendor and Device Id because they are representing the same LUN "D". However, each will have different SCSI addresses such as Port 0 Bus O Target 0 Lun O and Port 1 Bus 0 Target 0 Lun 0. The Vendor and Device ID gathered from the database (Item 4011) is used to find matching Vendor and Device ID in the database. When one is found, it will compare the SCSI addresses of each one to determine the lowest SCSI address for the matching Vendor and Device ID. In our example, Port 0 Bus 0 Target 0 Lun 0 is considered lower than Port 1 Bus 0 Target 0 Lun 0.

Figure 4C:
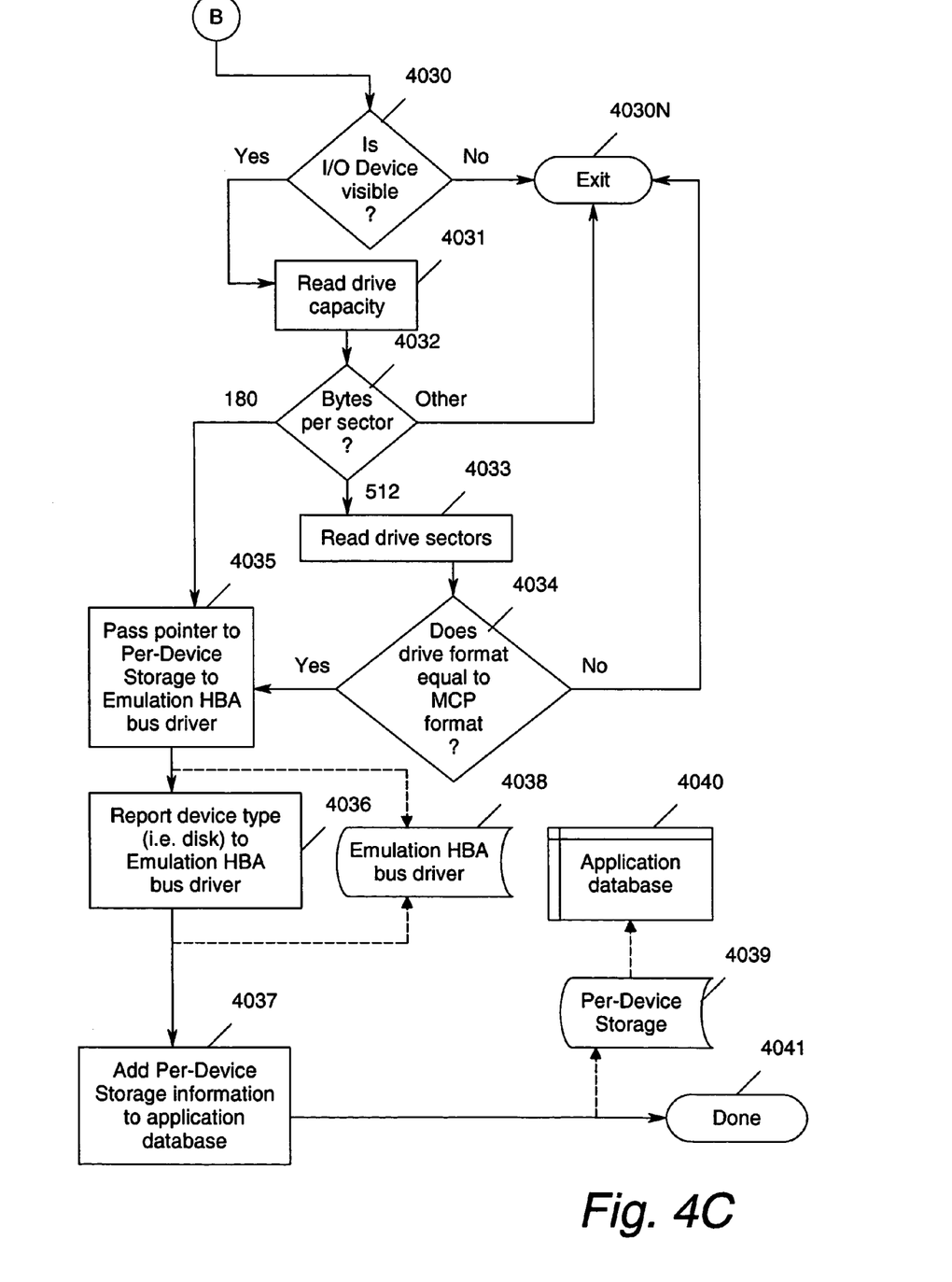

The process then continues to FIG. 4C through connector B. It should also be noted that the "physical" device I/O database 4023 is where the SCSI address is gathered. The "virtual" Per-Device storage 4024 is where the I/O device information is gathered.

If the answer to inquiry 4010 is NO, and the SCSI address is not in the database, the vendor ID information is gathered (Block 4010N). Once the vendor ID information (Item 4016) is gathered, the LUN ID information is gathered (Block 4017). Once the LUN ID (Item 4018) is gathered, the vendor ID and LUN ID is added (Block 4019) to Per-Device storage (Item 4039 of FIG. 4C). Next, the reported SCSI address is reported to Per-Device storage (Block 4020), and Per-Device storage 4039 is added to "physical" I/O Device database 4022 at Block 4021. The "physical" I/O Device database is a database of Per-Device storage for physical device disk nodes. The process then continues to FIG. 4C via connector B.

FIG. 4C continues from FIG. 4B and begins with an inquiry to check if the I/O device is visible (Diamond 4030). If the answer to inquiry 4030 is NO, and the I/O device is not visible, the process exits at bubble 4030N. If the answer to inquiry 4030 is YES, and the I/O device is visible, the drive capacity information is read (Block 4031) from the disk drive, and another inquiry is made to check how many bytes per sector exist (Diamond 4032). If the bytes per sector equal 180 bytes, the pointer to Per-Device storage is passed to Emulation HBA Bus Driver (Block 4035) and the device type is repeated to Emulation HBA Bus Driver (Block 4036). Next, the Per-Device storage (Item 4039) information is added to application database 4040 (Block 4037), and the process is done (bubble 4041).

If the bytes per sector equal 512 bytes, the drive sectors are read (Block 4033), and an inquiry is performed to check if the drive format is equal to Unisys MCP format (Diamond 4034). If the drive format is equal to MCP (YES), the process continues to Block 4035 where the "pointer" to Per-Device storage 4039 is passed to Emulation HBA Bus Driver 4038 and the device type is reported to Emulation HBA Bus Driver (Block 4030). Next, the Pre-Device storage information is added to application database 4040 via (Block 4037), and the process is done (bubble 4041). If the drive format is not equal to MCP format (NO to inquiry 4034), the process exits at bubble 4030N.

If the bytes per sector at diamond 4032 are any other number besides 180 and 512, the process exits at bubble 4030N.

While one embodiment of the described system and method has been illustrated, it should be understood that the invention may be implemented in other embodiments as defined in the attached claims.

What is claimed is:

1. In a network for operating a disk storage system wherein a server means with a first host operating system means and second operating system means which communicates with disk units in a storage module means, a system for utilizing disks having formats compatible with said second operating system means comprising:
   (a) server means including;
      (a1) a first host operating system means for requesting access to said storage module means;
      (a2) said second operating system means having emulation software means, including emulation device driver means, for communication with disk units having formats compatible with said second operating system means;
      (a3) a plurality of fiber channel bus adaptors connected to SCSI buses including;
         (a3a) means to register, via said emulation device driver means, each SCSI bus as either registered for SCSI pass-through or deregistered as not available for pass-through;
         (a3b) means to utilize said registered SCSI bus for data transmissions;
   (b) multipath connection means connecting said server means to said storage module means;
   (c) said storage module means holding multiple disk units.

2. The method of claim 1 wherein said first host operating system means includes:
   (a1a) means to categorize each one of a plurality of host bus adaptors via said emulation device driver means as either visible to said second operating system means or hidden to said second operating system means.

3. The system of claim 2 which includes:
   (a1b) means to block any I/O transmission sent directly to selected disk units in said storage module means from said first host operating system means or from an application.

4. In a network wherein a server means has a first operating system means and second operating system means for transmitting data to a storage module means, a system for utilizing said second operating system means to provide compatibility-formatted data to selected disk units inside said storage module means comprising:

(a) software emulation means in said server means for determining which ones of multiple path SCSI bus mean are available for data transmission;
(b) means for transmitting data to said disk storage module means over said available SCSI bus means;
(c) means to block any attempt by said first operating system means to transmit data directly to selected data units inside said storage module means.

5. In a network wherein a server having a first host operating system and a second operating system which communicate with disk units formatted for use with only one of said first and second operating systems, a method for utilizing said disk units formatted for said only one of said first and second operating systems, comprising the steps of:
(a) recognizing established virtual nodes for each disk unit, using disk virtualization software in said first operating system;
(b) providing multi-path I/O means for SCSI communications between said server and targeted disk units;
wherein step (b) of providing multi-path I/O means includes the step of:
(b1) establishing multiple SCSI buses wherein each SCSI bus is represented by an emulation device driver in said second operating system;
wherein step (b1) of establishing multiple SCSI buses includes the steps of:
(b1a) selecting a target disk unit, which is supported by emulation software applications in said second operating system, for SCSI pass-through of data;
(b1b) establishing a special interface for each disk unit to register and/or deregister as available and/or not available for SCSI pass-through.

6. The method of claim 5 wherein step (b1) further includes the steps of:
(b1c) transferring data via a selected SCSI bus to such targeted disk units as are registered.

7. The method of claim 5 which further includes the steps of:
(c) categorizing, in said first host Operating System, each of said disk units as either visible or invisible to applications;
(d) organizing a special emulation device drive to indicate a visible disk node.

8. The method of claim 7 wherein the step (d) of organizing and indicating said visible disk node includes the steps of:
(d1) determining if a disk unit is supported by emulation operations;
(d2) assigning a SCSI address to each targeted disk unit via possible SCSI addresses in a SCSI address database;
(d3) registering the assigned SCSI address of each said targeted disk unit to a supported emulation application and to an associated emulation bus driver.

9. The method of claim 8 which includes the steps of:
(e) blocking of any I/O transmission sent directly to a targeted disk unit from an application or from said first host operating system;
(f) transmitting any I/O data to said virtualization software for routing to an active I/O path.

10. The method of claim 7 which further includes the step of:
(14e) using an emulation device driver to recognize a non-selected disk node, which is hidden from said second operating system.

11. The method of claim 10 wherein said step (14e) for using said non-selected disk node emulation driver includes the step of:
(14e1) generating a database of possible SCSI addresses for each said disk unit;
(14e2) blocking any I/O which is sent directly to a target disk unit from an application or from said first host operating system.

* * * * *